United States Patent [19]

Hawerkamp

[11] Patent Number: 4,466,854
[45] Date of Patent: Aug. 21, 1984

[54] METHOD AND DEVICE FOR PRODUCING A HELICALLY WOUND TUBE

[76] Inventor: Manfred Hawerkamp, Altenrather Strasse, 47, 5210 Troisdorf, Fed. Rep. of Germany

[21] Appl. No.: 440,409

[22] Filed: Nov. 9, 1982

[30] Foreign Application Priority Data

Nov. 13, 1981 [DE] Fed. Rep. of Germany ....... 3145122

[51] Int. Cl.$^3$ ...................... B29C 19/00; B65H 81/00
[52] U.S. Cl. .................................... 156/429; 156/143; 156/244.11; 156/244.12; 156/244.13; 156/425; 156/431; 156/446; 156/500
[58] Field of Search .................. 156/143, 184, 244.11, 156/244.12, 244.13, 425, 429, 431, 446, 459, 500

[56] References Cited

U.S. PATENT DOCUMENTS

| | | | |
|---|---|---|---|
| 3,617,415 | 11/1971 | Hawerkamp | 156/244.12 |
| 3,919,026 | 11/1975 | Mizutani et al. | 156/244.12 |
| 3,957,940 | 5/1976 | Schubert et al. | 156/244.11 |
| 4,353,763 | 10/1982 | Simons | 156/244.13 |

Primary Examiner—Edward C. Kimlin
Assistant Examiner—Timothy W. Heitbrink
Attorney, Agent, or Firm—McGlew and Tuttle

[57] ABSTRACT

A device for producing a helically wound tube comprises a rotating mandrel around which the tube is wound and an extruding device having an extruder head oriented to direct a continuous strip of plastic through a profile pressure mandrel which defines a calibrating guide channel which in turn is oriented to deposit the desired width of extruded plastic strip onto the mandrel. The guide channel advantageously includes walls defining a cooling passage for a coolant for example on the wall over which the extruded plastic is directed. The extruder and the guide channel are mounted on a carriage so that they may be shifted longitudinally if the axis of the mandrel apply a continuous strip of material thereover at a selected pitch angle. The extruder advantageously includes means for directing a reinforcing rod member into the extruder head so that the extruded strip includes a central tubular reinforcement with a base flange on each side of the reinforcement.

9 Claims, 5 Drawing Figures

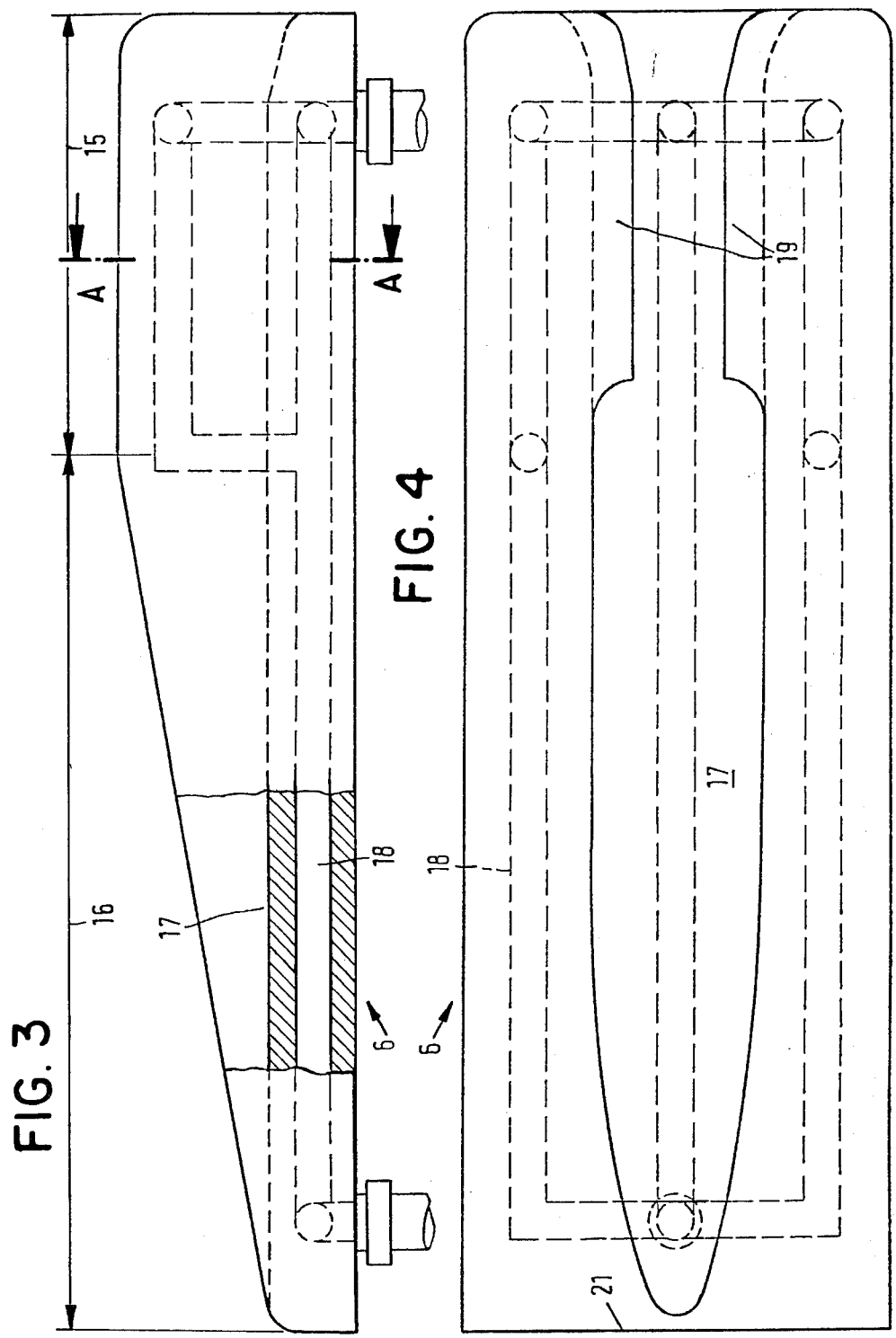

METHOD AND DEVICE FOR PRODUCING A HELICALLY WOUND TUBE

FIELD AND BACKGROUND OF THE INVENTION

This invention relates in general to extruding devices and in particular to a new and useful device for producing a helically wound tube.

This invention relates to a device for the production of a tube, container, or like cylindrical object (hereafter referred to simply as a tube) by the helical winding of a thermoplastics profile section molded in an extruder having an extrusion head onto a mandrel, in which a profiled pressure member of a width at least corresponding to the width of the plastics profile section and which welds together the abutting and/or overlapping edge regions of the wound plastics profile section, is displaceable along with the extruder in the axial direction relative to a power-driven rotating mandrel.

In one known device of this type (DAS 14 50 348), the extrusion head is disposed with its longitudinal axis normal to the axial direction of the mandrel and coincident with a secant of the mandrel and is adapted to extrude the plastics profile section as a hollow section having internal reinforcements, while the pressure member consists of a profiled roller freely rotatable about an axis parallel to the mandrel axis, on which the plastics profile section is bent against the curvature of the mandrel surface and simultaneously squeezed down. The major disadvantage of this device is to be seen in that the forming of the extruded plastics profile section by means of the profiled roller is very difficult to control and is subject to such large variations that the physical and technical properties of the resulting tubes, for example their load-carrying capacity, cannot be accurately predicted and substantial safety margins must therefore be allowed.

SUMMARY OF THE INVENTION

The invention provides a device in which tubes and the like can be produced with specified properties within extremely tight tolerances.

According to the present invention, a device for the production of a tube by the helical winding of a thermoplastics profile section onto a mandrel includes a profiled pressure member of width at least corresponding to the width of the plastics profile section, which welds together the abutting and/or overlapping longitudinal edge regions of the wound plastics profile section. The member is displaceable along with the extruder in the axial direction relative to the power-driven rotating mandrel and the extrusion head is disposed with its longitudinal axis on a tangent to the mandrel corresponding to the pitch of the helix. The extruder is adapted to extrude a plastics profile section having two base flanges forming the longitudinal edges and an outwardly projecting longitudinal reinforcement between them, while the pressure member is adapted as a calibrating slide having a guide channel for the longitudinal reinforcement and internal passages through which a coolant is circulated, and is disposed coaxially with the longitudinal axis of the extrusion head.

The invention is based primarily on the important discovery that it is in no way possible to maintain tight tolerances in the formation of an internally plain tube from a longitudinally reinforced and therefore externally uneven plastics profile strip in the final tubular form by the use of a pressure roller of the type hitherto normally used. This is particularly true when the plastics profile strip undergoes no further substantial profile changes on the pressure roller, apart from along the edge regions which abut and/or overlap each other in the wound state, that is when the strip is extruded as it were in the form required after winding, the pressure roller is profiled to conform to the external contour of the plastics profile strip. This is because the plastics material is still warm from the extruder and is subjected to the uncontrollable effects of circumferential and relative speeds which vary over the cross-section of the profiled roller. These problems surprisingly disappear when the profiled roller is replaced by the calibrating slide of the invention as a pressure member, to which the plastics material would adhere unless it were cooled. It is of decisive significance not only to extrude the plastics profile section in the configuration adapted for winding; having two base flanges forming the longitudinal edges and an outwardly projecting longitudinal reinforcement between them, but also to advance the plastics profile section between the extrusion head of the extruder and the calibrating slide along an exactly straight line, with no sagging. This is done by driving the mandrel at a peripheral speed corresponding to the extrusion speed and thus drawing the plastics profile section through the calibrating slide. This is the only direct means of ensuring that the physical and technical properties of the tube will remain within very tight tolerances.

Several possibilities for further development come within the scope of further features of the invention. Particularly in relation to the calibrating slide arrangement, the extrusion head for extruding the plastics profile section is preferably adapted to form a section having a tubular longitudinal reinforcement and longitudinal recesses, preferably gusset-shaped, between the base flanges forming the longitudinal edges and the tubular longitudinal reinforcement, while the calibrating slide has corresponding guide strips. By adapting this further development, in which the tubular longitudinal reinforcement is brought further away from the base flanges forming the longitudinal edges when it enters the calibrating slide than when it is still in the extrusion head, it is possible to pre-compensate for the higher shrinkage stresses that are set up as the wound tube cools down, in the region of the longitudinal reinforcement. This reinforcement has a smaller breadth than the plastics profile section with its longitudinal reinforcement. This is particularly important when the longitudinal reinforcement contains a supporting tube which could reduce the wall thickness of the layer of thermoplastics material lying between it and the mandrel, by reason of the increased shrinkage stresses. Practical experience has shown that there are particular advantages to be gained from making the calibrating slide, looking in the direction of advance of the plastics profile section, with an entry portion of constant cross-section leading into a laterally wedge-shaped exit length having a guide channel of gradually decreasing cross-section. The advantageous effect of this can probably be explained on the grounds that the outer edges of the longitudinal reinforcement on the plastics profile section experience a stronger cooling action than the base flanges forming the longitudinal edges, which have still to be welded together. With the extrusion head adapted to extrude the plastics profile section provided with a longitudinal reinforcement taking a supporting tube, it is preferable to adopt a form which facilitates starting up the device and the winding process, in which the guide channel terminates in the vicinity of the free end of the exit section and the calibrating slide can be advanced longitudinally away from or back towards the extrusion head. In this case, winding can be commenced without a supporting tube. The calibrating slide is retracted and its free end exerts the pressing action. After winding a few turns, the supporting tube is advanced through the extrusion head into the extruded product, and the calibrating slide is likewise advanced and the final winding conditions are established without problems. With this and other variants, it can be advantageous to mount the calibrating slide adjustably, at least with reference to its vertical distance from the mandrel. In this way, depending on the geometry of the longitudinal reinforcement, the plastics material in the difficulty manipulatable longitudinal reinforcement can be welded together without a supporting tube in the starting stages, and the welding pressure can be otherwise adjusted.

Accordingly, it is an object of the invention to provide a device for producing a helically wound tube which includes an extruder directing a continuous strip of plastic material through a profile pressure member forming a calibrating guide channel and onto a mandrel which is rotated while the extruder and guide channel and the mandrel are moved relatively in the direction of the axis of the mandrel in order to deposit a continuous strip of material onto the mandrel uniformly over lapped edges in a desired pitch angle.

A further object of the invention is to provide a method of forming a tube which comprises rotating a mandrel and continuously extruding a strip of material of an extruder through a calibrating guide channel as the mandrel and the extruder and guide channel are moved relatively in respect to the direction of the axis of the mandrel and using the guide channel to calibrate the strip of material which is deposited and to cool it as it is desposited on the mandrel.

A further object of the invention is to provide a device for producing a helically wound tube which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is an enlarged side elevational and partially sectional view of a guide channel used in the device of FIG. 1;

FIG. 4 is a top plan view of the guide channel shown in FIG. 3; and

DESCRIPTION OF THE PREFERRED EMBODIMENTS

Figure 1:
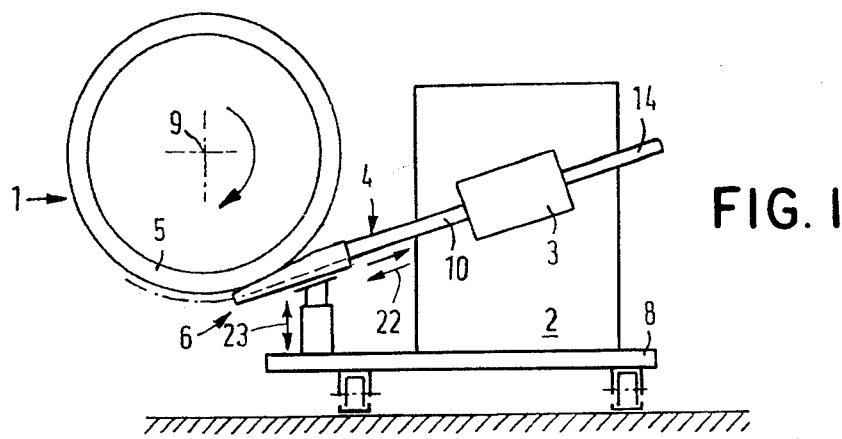
FIG. 1 is a diagrammatic side elevational view of a device for producing a helically wound tube constructed in accordance with the invention.

Referring to the drawings in particular the invention embodied therein comprises a device for producing a helically wound tube comprising a rotating mandrel 5 around which the tube is wound. A profiled pressure member generally designated 6 forms a calibrating guide channel disposed alongside the mandrel 5. An extruder of a plastic strip generally designated 2 having an extrusion head 3 is disposed alongside the mandrel 5 and extrudes a continuous strip of plastic material through the guide channel 6 where it is directed at a selected pitch angle onto the mandrel 5. During the depositing of the strip material on the mandrel it is rotated and both the extruder tool and the guide channel 6 are mounted on a carriage 8 for movement relative to the mandrel in respect to the axis 9 of the mandrel.

In accordance with the method of the invention, a continuous flat strip of material is first directed from the extrusion head 3 through the guide channel 6 which is oriented to deposit the strip of material onto the rotating mandrel 5 as the mandrel is rotated the extruder in the guide channel are moved along the length of the mandrel to deposit continuous windings of the strip material onto the mandrel. In accordance with the method it is also preferable to provide a reinforcement of the strip 4 which is achieved by directing a reinforcing member 14 through the extrusion head to cause the formation of a tubular reinforcement or portion 12 of the strip material leaving a base flange 11 on each side thereof as shown in FIG. 5.

The device illustrated is designed for the production of a tube 1 by the helical winding of a thermoplastics profile section or strip 4 moulded in an extruder 2 having an extrusion head 3 and directing it onto a mandrel 5. The mandrel 5 operates in conjunction with a profile pressure member 6 of a width exceeding the width of the plastics profile section 4, which welds together the obliquely abutting and/or overlapping edges 7 of the plastics profile section 4. The pressure member 6, together with the extruder 2 and its extrusion head 3, are movably mounted on a carriage 8 relative to the fixed mandrel 5, which merely rotates about is axis 9.

Figure 2:
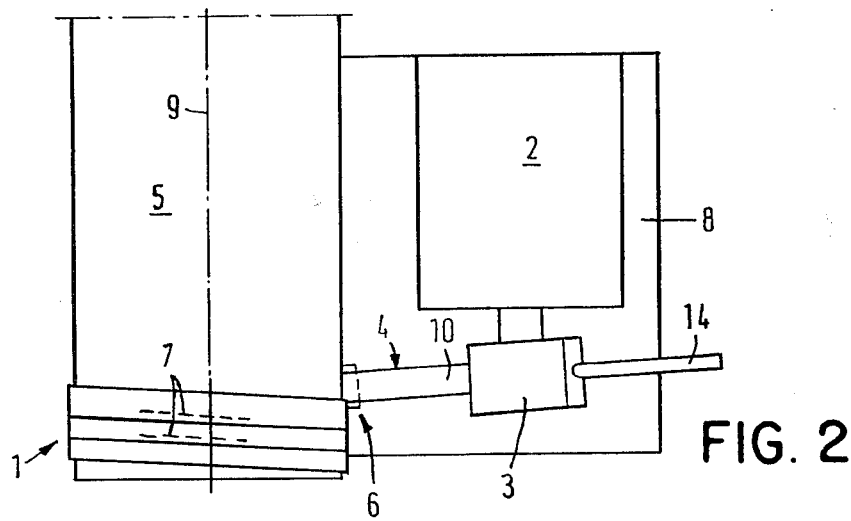
FIG. 2 is a top plan view of a device indicated in FIG. 1.
Figure 5:
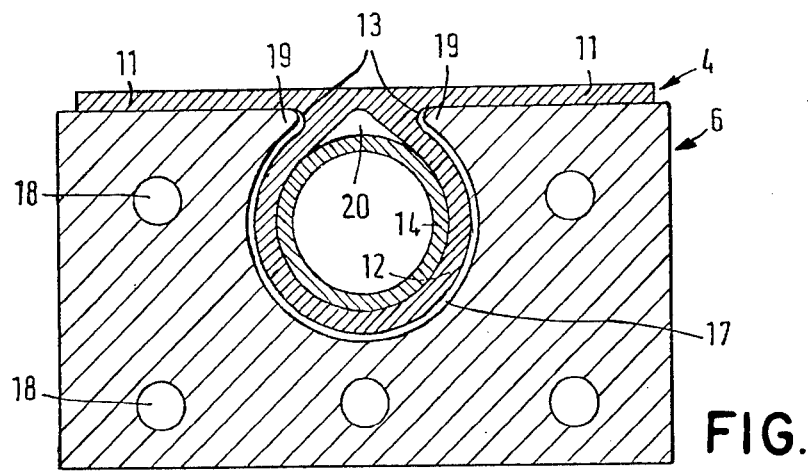
FIG. 5 is a section taken along the line A—A of FIG. 3.

The extrusion head 3 is disposed with its longitudinal axis on a tangent 10 to the mandrel 5, corresponding to the pitch of the helix (FIGS. 1 and 2), and is adapted to extrude a plastics profile section 4 having two base flanges 11 forming the longitudinal edges and an outwardly projecting tubular longitudinal reinforcement 12 between them (FIG. 5). Gusset-shaped longitudinal recesses 13 run between the base flanges 11 forming the longitudinal edges and the longitudinal reinforcement 12. The longitudinal tubular reinforcement or portion 12 accommodates the supporting member or tube 14, which is introduced from the rear into the extrusion head 3 of the extruder 2 (FIGS. 1 and 2).

The pressure member 6 is formed by a calibrating slide having two portions 15,16, having a guide channel 17 for the longitudinal tubular reinforcement 12. The calibrating slide is disposed coaxially with the longitudinal axis of the extrusion head 3 and has suitable coolant passages 18 through which a coolant is circulated. Corresponding to the longitudinal recesses 13 in the plastics profile section 4, the calibrating slide 6 has guide rails 19 which protrude into the longitudinal recesses 13. Reference number 20 in FIG. 5 indicates a space by which the tubular longitudinal reinforcement 12 in the calibrating slide is distanced further from the base flanges 11 forming the longitudinal edges than within the extrusion head 3, to compensate for undesirable subsequent shrinkage forces. Furthermore, FIGS. 3 and 4 show that looking in the direction of advance of the plastics profile section 4, the calibrating slide 6 has an entry portion of length 15 and constant cross-section (see also FIG. 5) leading into a laterally wedge-shaped exit portion of length 15 (FIG. 3 only) having a guide channel 17 of gradually decreasing cross-section. Towards the free end 21 of the exit portion 16 the guide channel 17 runs out. As the arrows 22 and 23 in FIG. 1 indicate, the calibrating slide 6 can be advanced or retracted along its axis away from or back towards the extrusion head 3 (arrow 22) and is also adjustable at least with respect to its vertical distance from the mandrel 5 (arrow 23).

The functioning of the device just described is readily apparent from the figures. The mandrel 5 is rotated under power at a peripheral speed corresponding to the extrusion speed and the calibrating slide 6 is advanced until the free end 21 of its exit portion is in the welding position. At the start, material is extruded without a supporting tube 14. As soon as a few turns have been formed, the supporting tube 14 is introduced into the extrusion head 3 and the calibrating slide 6 is advanced again so that the entry portion 15 reaches the welding position. As extrusion commences, the carriage 8 on which the extruder 2 and the calibrating slide 6 are mounted is sent in synchronous motion.

While specific embodiments of the invention have been shown and described in detail to illustrate the application of the principles of the invention, it will be understood that the invention may be embodied otherwise without departing from such principles.

What is claimed is:

1. A device for producing a helically wound tube having a helical pitch angle, comprising a rotating mandrel around which the tube is formed, a profiled pressure applying member forming a calibrating guide channel disposed alongside said mandrel and having a receiving end for receiving a plastic strip and a delivery end oriented toward said mandrel, an extruder of a plastic strip oriented to direct a continuous extrusion strip to the receiving end of said guide channel for delivery through the guide channel and to the mandrel, said guide channel having walls forming the strip into a shape having two base flanges and a longitudinal portion, means for cooling said guide channel to cool the plastic strip delivered therethrough and means permitting relative movement of said mandrel and said extruder relative to the axis of said mandrel, said delivery end extending tangentially to said mandrel and at the pitch angle and having a surface facing said mandrel over which said flanges slide, said pressure applying member having a width at least equal to said strip.

2. A device according to claim 1 wherein said guide channel walls define a constant cross-sectional portion at said receiving end and a converging wedge shaped portion decreasing toward said mandrel at said delivery end.

3. A device according to claim 1, wherein said two base flanges of said strip are dimensioned so that they at least partly overlap each other in the helically wound tube having the helical pitch angle, said longitudinal portion of said strip being tubular.

4. A device according to claim 3 wherein said guide channel walls define a constant cross-sectional portion at said receiving end and a converging wedge shaped portion decreasing toward said mandrel at said delivery end.

5. A device according to claim 1, wherein said extruder includes means for supplying a reinforcing member into said calibrating guide channel and within said longitudinal portion of said strip.

6. A device according to claim 4, wherein said extruder includes means for supplying a reinforcing member into said calibrating guide channel and within said longitudinal portion of said strip.

7. A device according to claim 1, including means mounting said calibrating guide channel for movement toward and away from said mandrel and in respect to said extruder.

8. A device according to claim 7, including a carriage carrying said extruder in said guide channel movable along the axis of said mandrel, means mounting said guide channel on said extruder permitting elevation and rotation of said guide channel as well as displacement toward and away from said mandrel and said extruder.

9. A device according to claim 1, wherein said extruder has an opening therethrough, a supporting tube extending through the opening of said extruder to said guide channel and defining a circular path in said guide channel around said tubular reinforcement forming a portion of said strip into a tubular reinforcement.

* * * * *